(12) United States Patent
Ardila et al.

(10) Patent No.: US 10,684,998 B2
(45) Date of Patent: Jun. 16, 2020

(54) AUTOMATIC SCHEMA MISMATCH DETECTION

(71) Applicant: Microsoft Technology Licensing, LLC, Redmond, WA (US)

(72) Inventors: Pedro Ardila, Seattle, WA (US); Christina Storm, Seattle, WA (US); Andrew J. Peacock, Seattle, WA (US); Amir Netz, Bellevue, WA (US); Cheryl Couris, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 14/550,856

(22) Filed: Nov. 21, 2014

(65) Prior Publication Data
US 2016/0147796 A1    May 26, 2016

(51) Int. Cl.
    *G06F 16/00*    (2019.01)
    *G06F 16/21*    (2019.01)
    *G06F 8/20*     (2018.01)
    *G06F 8/34*     (2018.01)
    *G06F 3/0486*   (2013.01)

(52) U.S. Cl.
    CPC .......... *G06F 16/211* (2019.01); *G06F 3/0486* (2013.01); *G06F 8/20* (2013.01); *G06F 8/34* (2013.01)

(58) Field of Classification Search
    CPC combination set(s) only.
    See application file for complete search history.

(56) References Cited

U.S. PATENT DOCUMENTS

| 6,483,524 | B1  |   | 11/2002 | Petchenkine et al. |
|-----------|-----|---|---------|---------------------|
| 6,996,268 | B2  | * | 2/2006  | Megiddo ............ G06K 9/00456 382/159 |
| 7,343,377 | B1  | * | 3/2008  | van Opdorp ........ G06F 16/2365 |
| 7,403,956 | B2  | * | 7/2008  | Vaschillo .............. G06F 16/284 707/770 |

(Continued)

FOREIGN PATENT DOCUMENTS

| CN | 102279737 A | 12/2011 |
|----|-------------|---------|
| CN | 102722542 A | 10/2012 |

(Continued)

OTHER PUBLICATIONS

"JasperETL", Retrieved on: May 21, 2014 Available at: ftp://ftp.heanet.ie/mirrors/sourceforge/j/project/ja/jasperetl/jasperetl/JasperETL%202.3.1/JasperETL_UG_v2.3_a.pdf.

(Continued)

*Primary Examiner* — Farhan M Syed
(74) *Attorney, Agent, or Firm* — Davin Chin; Chin IP, PLLC

(57) ABSTRACT

Mismatches between schema elements of a data set and a job are identified automatically. Furthermore, the mismatches can be presented visually in conjunction with an interactive visual workspace configured to support diagrammatic authoring of data transformation pipelines. After a data set is connected to a job, one or more mismatches can be determined and presented in context with the workspace. In addition, schema elements can be reconfigured by way of interaction with a visual representation of schema elements to resolve mismatches.

25 Claims, 10 Drawing Sheets

(56) References Cited

U.S. PATENT DOCUMENTS

| | | | |
|---|---|---|---|
| 7,415,517 B1* | 8/2008 | Schleit | H04L 29/06 |
| | | | 709/224 |
| 7,707,218 B2* | 4/2010 | Gocht | G06Q 30/02 |
| | | | 707/758 |
| 7,739,292 B2 | 6/2010 | Falk et al. | |
| 8,041,746 B2* | 10/2011 | Stuhec | G06Q 30/06 |
| | | | 707/802 |
| 8,234,312 B2 | 7/2012 | Thomas | |
| 8,386,493 B2 | 2/2013 | Muni et al. | |
| 8,583,626 B2 | 11/2013 | Mandelstein et al. | |
| 8,799,772 B2* | 8/2014 | Megiddo | G06K 9/00456 |
| | | | 715/243 |
| 9,406,037 B1* | 8/2016 | Papakonstantinou | G06F 16/358 |
| 2003/0123721 A1* | 7/2003 | Megiddo | G06K 9/00456 |
| | | | 382/159 |
| 2005/0050069 A1* | 3/2005 | Vaschillo | G06F 16/284 |
| 2005/0257193 A1* | 11/2005 | Falk | G06F 8/315 |
| | | | 717/109 |
| 2005/0261990 A1* | 11/2005 | Gocht | G06Q 30/02 |
| | | | 707/758 |
| 2005/0262190 A1 | 11/2005 | Mamou et al. | |
| 2005/0289448 A1* | 12/2005 | Megiddo | G06K 9/00456 |
| | | | 715/201 |
| 2006/0218158 A1* | 9/2006 | Stuhec | G06F 16/258 |
| 2008/0021912 A1* | 1/2008 | Seligman | G06F 16/36 |
| 2008/0126987 A1 | 5/2008 | Meschian et al. | |
| 2009/0024642 A1* | 1/2009 | Vaschillo | G06F 16/284 |
| 2009/0112916 A1* | 4/2009 | Stuhec | G06Q 10/10 |
| 2010/0235725 A1 | 9/2010 | Drayton et al. | |
| 2014/0082424 A1 | 3/2014 | Sanders | |
| 2014/0236722 A1* | 8/2014 | Rathus | G06Q 30/0256 |
| | | | 705/14.54 |

FOREIGN PATENT DOCUMENTS

| | | |
|---|---|---|
| CN | 102792298 A | 11/2012 |
| EP | 2400443 A1 | 12/2011 |

OTHER PUBLICATIONS

"International Search Report & Written Opinion Issued in PCT Application No. PCT/US2015/061209", dated Feb. 5, 2016, 14 Pages.

"Second Written Opinion Issued in PCT Application No. PCT/US2015/061209", dated Jul. 12, 2016, 7 Pages.

"International Preliminary Report on Patentability Issued in PCT Application No. PCT/US2015/061209", dated Oct. 7, 2016, 8 Pages.

"Office Action Issued in European Patent Application No. 15802305.1", dated Apr. 26, 2019, 4 Pages.

"First Office Action and Search Report Issued in Chinese Patent Application No. 201580062833.3", dated Nov. 27, 2019, 21 Pages.

* cited by examiner

AUTOMATIC SCHEMA MISMATCH DETECTION

BACKGROUND

Processing of vast quantities of data, or so-called big data, to glean valuable insight involves first transforming data. Data is transformed into a useable form for publication or consumption by business intelligence endpoints, such as a dashboard, by creating, scheduling, and executing of one or more jobs. In this context, a job is a unit of work over data comprising one or more transformation operations. Typically, jobs are manually coded by data developers, data architects, business intelligence architects, or the like. Further, a developer, or the like individual, is tasked with ensuring that data consumed by a job is structured in a manner acceptable by the job.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to automatic schema mismatch detection. In response to a user connecting a data set to a job on a workspace of a visual authoring interface, a schema-matching process is initiated. The schema-matching process identifies matches and detects mismatches between elements of a data set schema and a schema the job expects. Mismatches can be detected based on a measure indicative of strength of correspondence and a predetermined threshold. Detected mismatches can be presented to a user within a portion of the visual authoring interface. Furthermore, a user can interact with a detected mismatch in a manner that enables the mismatch to be resolved.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below generally pertain to automatic schema mismatch detection and resolution. A pipeline comprises a set of one or more related jobs with output of a first job optionally providing input to second job. For example, one or more input data sets can be connected to a job that consumes input data sets, performs a data transformation operation, and produces an output data set. The schema of an input data set can differ from the schema of a job, or, in other words, the schema the job expects. These differences need to be resolved before a job can be successfully performed. As provided herein, differences between a data set schema and a job schema can be determined automatically after a data source connected to a job. In conjunction with an interactive visual workspace, diagrammatically connecting a data source to a job can initiate a schema-matching process that can classify schema elements as a match or mismatch. Whether an element of a schema is a match or mismatch with respect to what is expected by a job can be based on correspondence strength and a predetermined threshold, wherein correspondence strength is a confidence measure computed as a function of one or more factors including but not limited to element data type and name. Mismatches can be presented in context with the visual workspace and enable a user to resolve the mismatches. For instance, schema elements associated with both a data set and a job can be presented with mismatching elements visually distinguished from matching elements. A user can subsequently resolve a mismatch graphically with one or more gestures that match a data source and job schema element. Schema matching is thus streamlined, or made more efficient, by exposing schema mismatches and allowing easy correction thereof, as opposed to requiring a user to specify all matches for schema elements of an input data set and consuming job.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
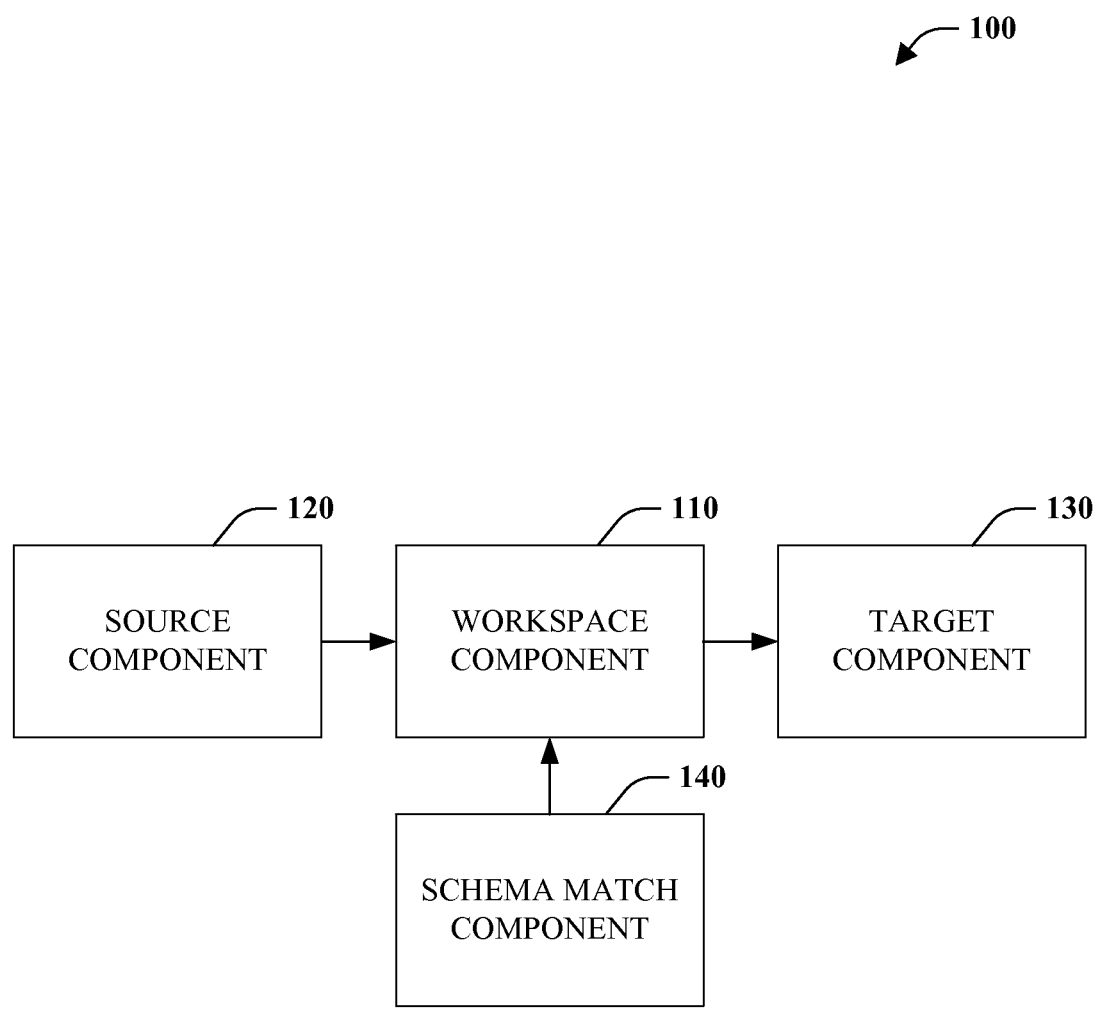
FIG. 1 is a block diagram of a visual authoring system.

Referring initially to FIG. 1, a visual authoring system 100 is illustrated. The visual authoring system 100 includes workspace component 110, source component 120, target component 130, and schema match component 140. The workspace component 110 is configured to enable diagrammatic authoring of jobs and pipelines, by providing an interactive visual workspace or canvas, wherein a pipeline comprises a set of one or more related jobs with output of a first job optionally providing input to second job. For example, a data set can be represented as a cylinder and connected by an arrow to a job that consumes the data set and produces a modified data set. Essentially, a user can draw a diagram of relationships between data sets and jobs. This results in an intuitive experience that saves time with respect to understanding relationships and ultimately specifying pipelines. Moreover, the schema match component 140 is configured to identify schema mismatch automatically and enable resolution of identified mismatches between data sources and jobs.

The source component 120 is configured to produce a visual representation of available data sources or data sets, comprising collections of data, for job authoring. Arbitrary data sets can be acquired and made available by the source component 120 including on-premises data sources and cloud-based data sources of substantially any format (e.g., table, file, stream . . . ) or structure (e.g., structured, unstructured, semi-structured). In other words, the source component 120 is configured to expose heterogeneous data sources. Collections of data can be made available by search and import functionality provided by the source component 120. Additionally, the source component 120 can be configured to monitor user or entity accounts or the like and make accessible data sources available automatically. Data sources rendered by the source component 120 are interactive and can be used as input for one or more jobs. For example with a gesture, such as drag-and-drop, a data source from a source area can be added to a workspace.

The target component 130 is configured to provide a visual location to display final data sets after all transformations have been applied. These data sets can subsequently be published or consumed by an application, such as an analytics application. A result of a job, or series of jobs, can be dragged from the workspace and dropped in a target visualization area.

The workspace component 110 is configured to enables visual authoring of jobs comprising one or more transformation operations and pipelines comprising set of one or more related jobs with output of a first job optionally providing input to second job. In particular, the workspace component 110 is configured to facilitate job and pipeline construction by way of a diagram on a workspace. For example, a user can acquire a data source by dragging and dropping a visual representation of the data source from a source to a workspace pane or panel of a user interface. The data source can be connected to a previously authored job (e.g., created automatically with data preview and/or manually coded), for example by drawing an arrow from the data source to the job to indicate the data source provides input that the job consumes and performs one or more data transformation operations (e.g., sort, group, pivot, split, filter . . . ) thereon. Additionally, a representation of the transformed output can be linked to a representation of a job on the workspace. As a result, a diagram is displayed of a job receiving input from a data source and outputting a new data source that reflects application of one or more transformation operations of the job.

The schema match component 140 is configured to identify matches as well as mismatches of schema elements between a data source and a job. Matches and mismatches can be determined automatically based on a confidence measure computed as a function of one or more factors and in comparison with one or more predetermined thresholds. In one instance, factors such as element type and element name, among other things can be acquired for schema elements of a data set and job. Based thereon, a confidence measure representative of the strength of a "match," or more generally, the strength of correspondence between schema elements can be computed. The confidence measures can then be compared with one or more thresholds indicative of a mismatch, match, or something in between. From comparison with one or more thresholds, schema elements of a data source can be classified with respect to schema elements associated with a job. For example, if the highest measure of confidence between two schema elements is less than fifty percent (50%), a mismatch may be identified. By contrast, if the highest measure of confidence is above fifty percent (50%), a match may be identified. Of course, a third option may be that it is uncertain whether there is a mismatch or a match. For instance, above a seventy percent (70%) measure of confidence a match can be said to exist, below fifty percent (50%) a mismatch can be said to exist, and between fifty and seventy percent (50-70%) can be classified as indeterminate or the like.

Figure 2:
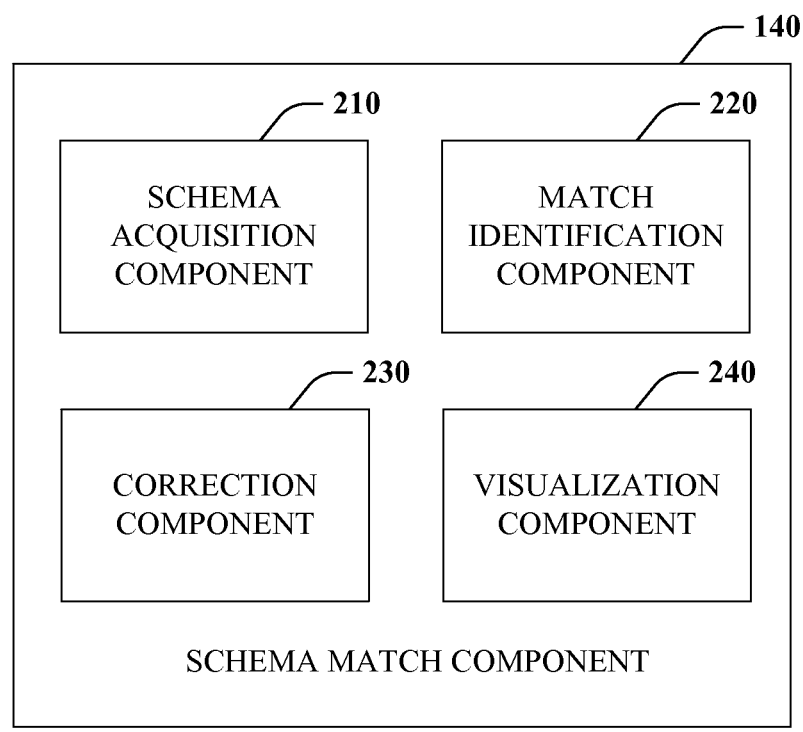
FIG. 2 is a block diagram of a representative schema match component.

FIG. 2 depicts a representative schema match component 140. The schema match component includes schema acquisition component 210, match identification component 220, configuration component 230, and visualization component 240. The schema acquisition component 210 acquires a schema from a data source and a job, wherein a job schema corresponds to a schema that is expected by a job. A data set schema and job schema can be received or retrieved from the source or job or alternatively determined by analyzing the data source or job. The match identification component 220 is configured to classify a set of schema elements as a match or mismatch, among other things.

Figure 3:
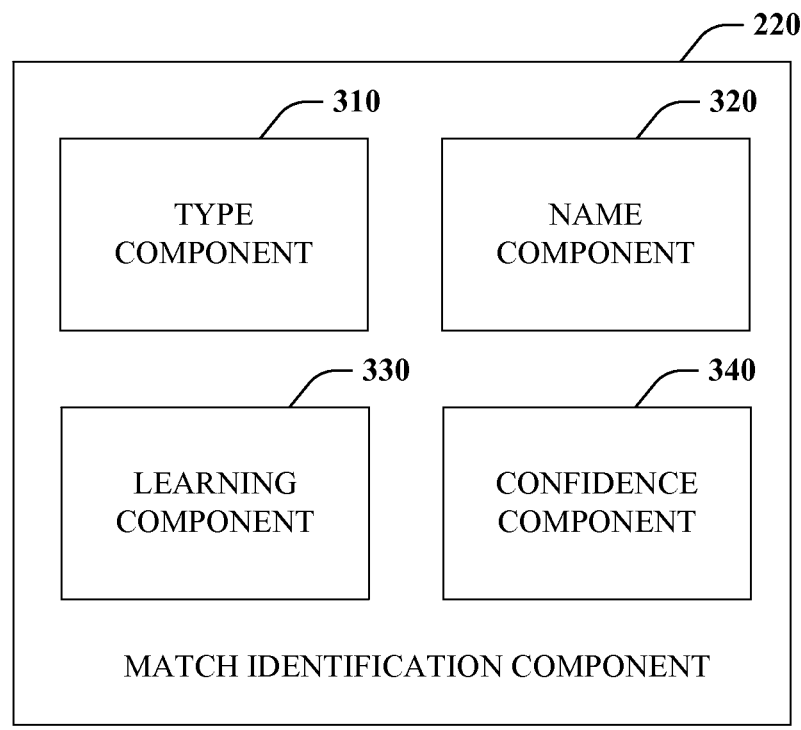
FIG. 3 is a block diagram of a representative match identification component.

Turning attention briefly to FIG. 3, a representative match identification component 220 is illustrated. The match identification component 220 includes type component 310, name component 320, learning component 330, and confidence component 340. The type component 310 is configured to determine type matches and mismatches between schema elements. More specifically, the type component 310 is configured to identify schema-element data types including primitive types (e.g., integer, real, Boolean . . . ) and composite types (e.g., array, set, record, object . . . ) and determine which schema elements match and do not match based on type. The name component 320 is configured to determine schema matches and mismatches based on schema element name. If schema elements include the same or similar names (e.g., set forth in a dictionary of synonyms), the schema elements can be deemed a name match. Conversely, if schema elements include different names, the schema elements can be considered a name mismatch. The learning component 330 is configured to learn matches and mismatches based on interactions from one or more users. For example, if a user previously indicated that a first element was a match to a second element, subsequently, the learning component 330 can be utilized to indicate a match when the first element and the second element are encountered again. The confidence component 340 is configured to generate a confidence measure that captures the strength of correspondence between schema elements. In one instance, a value can be produced representing a percentage match or mismatch between scheme elements. For example, a first element and a second element match with seventy percent (70%) confidence. Furthermore, the confidence component 340 can acquire and use input from the type component 310, the name component 320, and the learning component 330 in generating a confidence measure. For instance, if a two schema elements are of the same data type and name, there is a high likelihood that the elements match. By contract, there is less likelihood of a match and higher probability of a mismatch if one or more of the data type and name are dissimilar.

Returning to FIG. 2, the correction component 230 is configured to facilitate resolution of mismatches. If mismatches exist between schema elements, the correction component 230 provides a mechanism to allow a user to correct these mismatches so that the entire schema of a data set matches the schema expected by a job. Mismatches can be presented, and a user can correct the mismatches graphically, in accordance with an embodiment, by mapping schema elements of a data source with matching schema elements of a job. This can be done by positioning matching schema elements relative to one another (e.g., in the same row of a table) or by drawing lines connecting matching elements. Alternatively, such mapping can be performed by way of code specification.

The visualization component 240 is configured to present a visualization regarding schema mismatch detection and resolution in context with the visual authoring system 100. In one instance, the visualization component 240 can render a visual representation of schema element matches as well as mismatches. For example, the visualization component 240 can generate and present schema elements of a data set next to potential matches with job schema elements. Further, a graphical representation can indicate whether two schema elements are matches or mismatches. For instance, a green dot and/or check can be used to indicate a high probability of a match, while a red dot and/or ex can be used to signal high probability of a mismatch. Of course, additional graphics can be presented to represent at least one middle ground between a match and a mismatch, wherein the confidence measure is between that of a match or a mismatch, for example represented by a yellow dot and/or question mark. In another instance, the visualization component 240 can provide an interactive visual mechanism to correct mismatches. By way of example, a schema element can be selected, dragged, and dropped into a new location corresponding to a matching schema element. Alternatively, lines can be drawn to connect matching schema elements. Furthermore, upon receiving input from a user to resolve a mismatch, the visual display of schema elements can be updated to reflect changes made and an indication of match can be displayed. Thus, a user can iteratively address mismatches until no mismatches remain.

Figure 4:
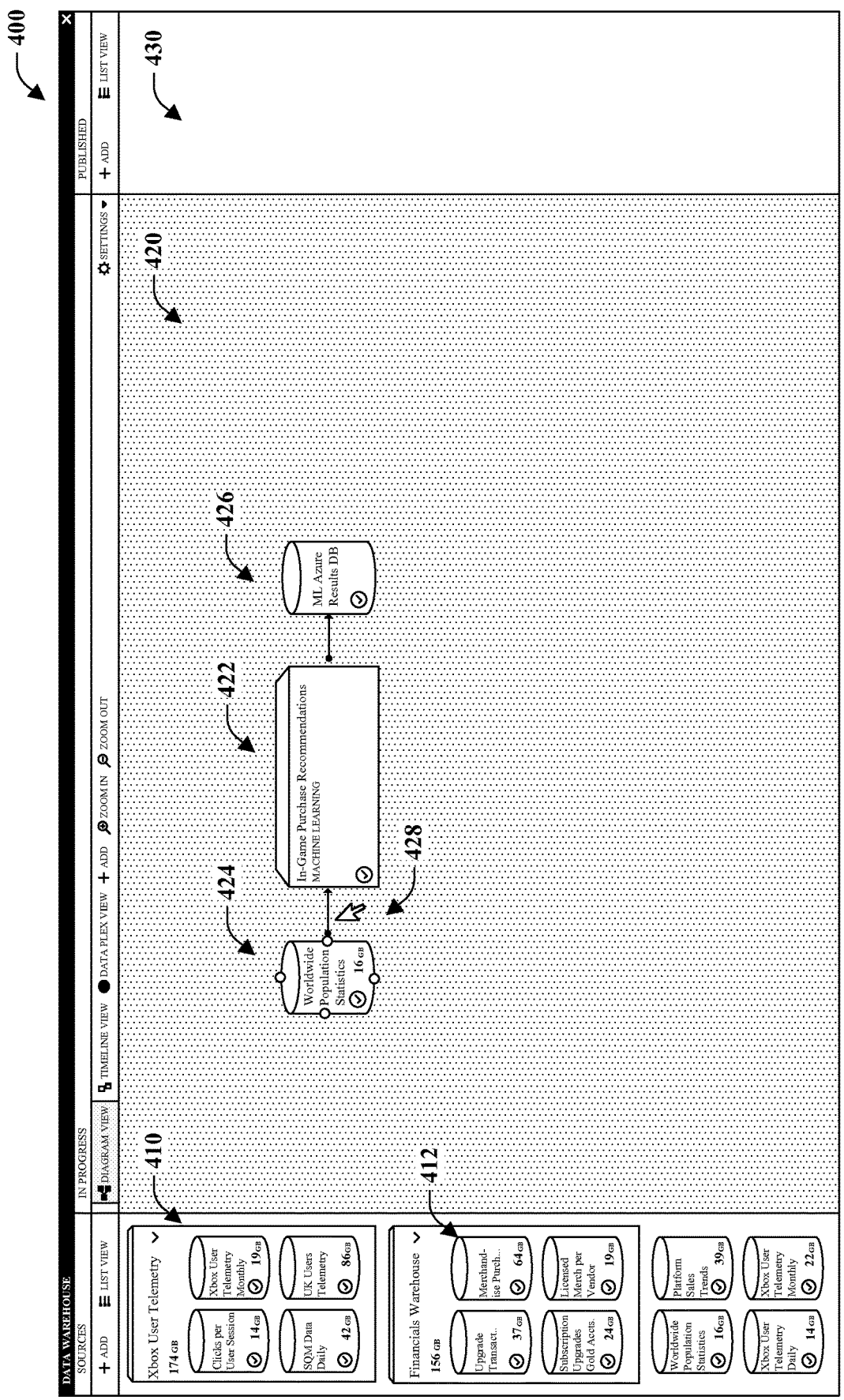
FIG. 4 is a screenshot of an exemplary visual authoring interface.
Figure 5:
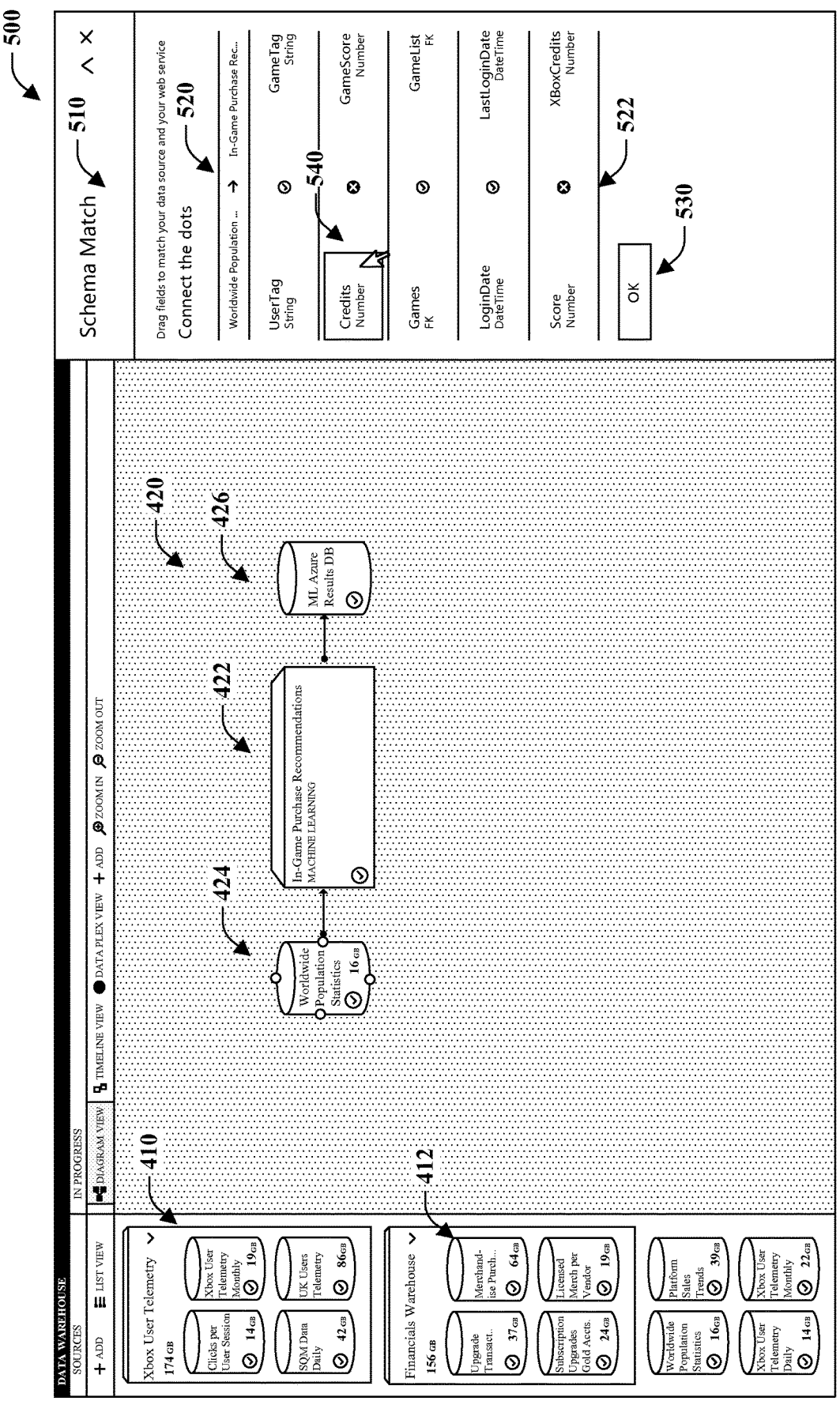
FIG. 5 is a screenshot of an exemplary visual authoring interface with a panel exposing mismatches.
Figure 6:
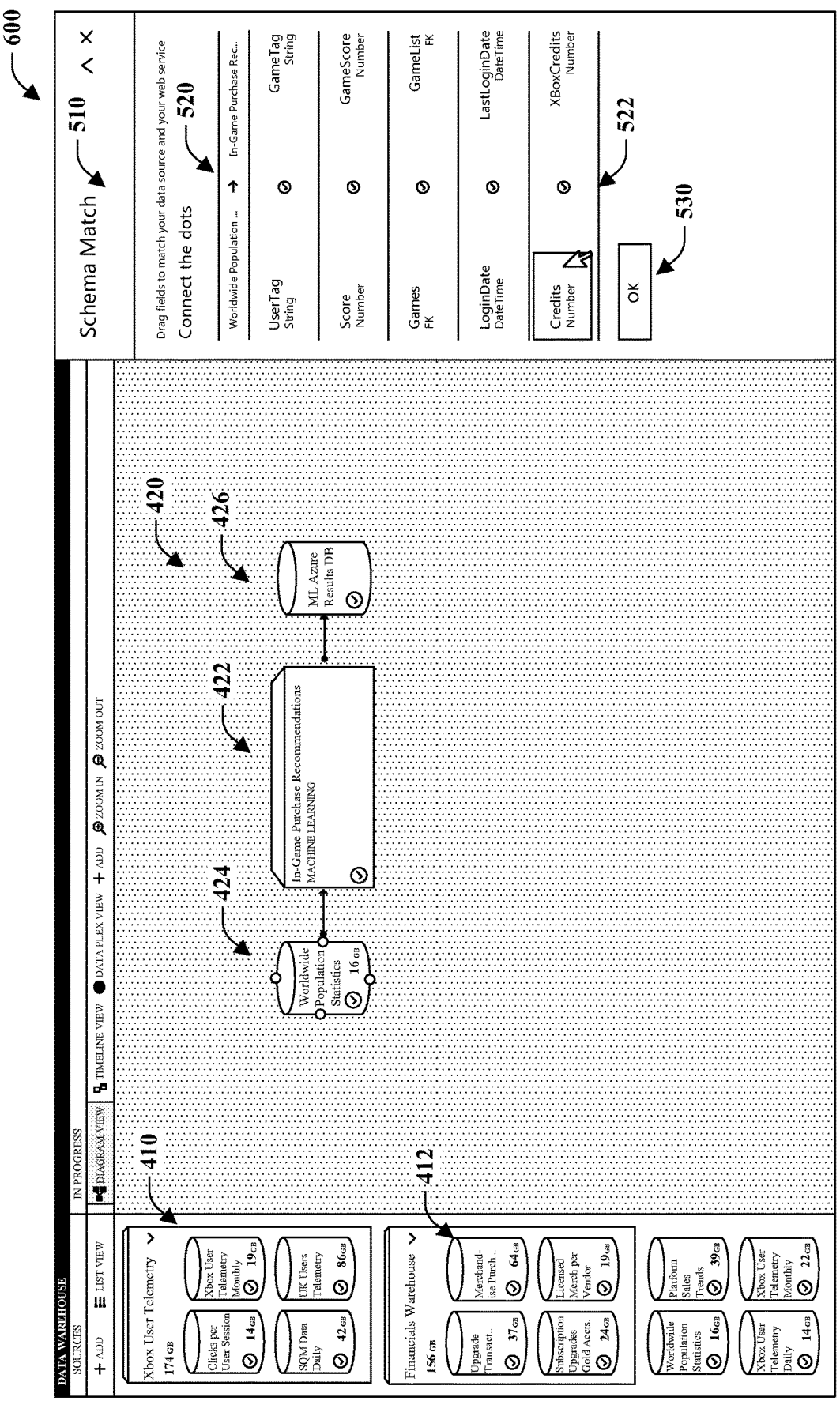
FIG. 6 is a screenshot of an exemplary visual authoring interface with a panel showing resolution of mismatches.

FIGS. 4-6 are exemplary screenshots illustrating various visualization aspects associated with the visual authoring system 100 including schema match component 140. These screenshots are intended to aid clarity and understanding with respect to aspects of this disclosure and are not intended to limit the claimed subject matter thereto. It is to be appreciated that the provided screenshots depict solely one implementation. Various other combinations and arrangements of graphical elements and text are contemplated and intended to fall within the scope of the appended claims. Furthermore, it is to be appreciated that various sounds can also be employed to aid a user in authoring a pipeline including identification and resolution of schema mismatches.

FIG. 4 is a screenshot of a visual authoring interface 400 that can be produced by the visual authoring system 100. As shown, the interface includes three panels, source panel 410, workspace panel 420, and published panel 430. The source panel 410 presents a plurality of available data sources 412 and enables sources to be added or deleted therefrom. It should be appreciated that the data sources 412 depicted in source panel 410 can be arbitrary data sources. For example, some data sources 412 can be associated with on-premises data while other data sources are associated with network or cloud data stores. Furthermore, the data sources 412 can be of substantially any structure or format. The workspace panel 420 provides an interactive diagrammatic view of data sources and jobs. As shown, a job such as one that provides purchase recommendations is represented as a cube 422. The cube 422 is connected to a data set represented as a first cylinder 424. In accordance with one implementation, the data set representation could have been dragged and dropped from the source panel 410. A line with an arrow connects the first cylinder 424 to the cube indicating flow of data from left to right from the source to the job. Additionally, output of the job is represented as a second cylinder 426 and connected with a line and arrow from the cube 422 to the second cylinder 426 depicting that the second cylinder represents the output of a job. The published pane 430 provides visual representation of published or consumable data sources after all desired transformations are performed. Upon connecting the first cylinder representing a data set to the cube 422 representing a job in the workspace panel 420, for instance by drawing a line 428 connecting the first cylinder 424 to the cube 422, a schema-matching process can be initiated and the screenshot of FIG. 5 can result.

FIG. 5 is a screenshot of a visual authoring interface 500 that can be produced by the visual authoring system 100. Visual authoring interface 500 is similar to visual authoring interface 400 in that it includes the source panel 410 and the workspace panel 420, as previously described. In addition, schema match panel 510 is presented in context, or in situ, with the workspace panel 420, after a user connects a data source to a job. Connection of a data source to a job can trigger determination of matches and mismatches with respect to data source schema and expected schema by the job, and spawning of the schema match panel 510 to at least display results. The schema match panel 510 includes table 520 and button 530 to accept mappings. The table 520 includes three columns. The first column corresponds to data-source schema elements. The third column corresponds to job schema elements, and the second column captures correspondence information. Rows are populated with a data set schema element, a job schema element, and a visual indicator 522 of whether the schema elements are mismatches or matches.

Here, the first column corresponds to schema elements of a "Worldwide Population Statistics" data set and the third column corresponds to the expected and acceptable schema for an "In-Game Purchase Recommendation" job. Each row includes schema element names and data types with an indication of whether there is a mismatch, denoted by a circumscribed letter "x," or a match, designated by a circumscribed check. Of the five displayed rows, two rows show mismatches between schema elements. In particular, "Credits" is shown as a mismatch with "GameScore" and "Score" is displayed as a mismatch with "XboxCredits," all of which are of type number. In this case, "Credits" is a match with "XboxCredits" and "Score" is a match with "GameScore." To correct the mismatches, the user can select the "Credits" element as shown at 540, drag, and drop the element in the row that includes the "XboxCredits" element. The result of this action is provided in FIG. 6.

FIG. 6 is a screenshot of a visual authoring interface 600 that can be produced by the visual authoring system 100. Similar to interface 500 of FIG. 5, the interface 600 includes the source panel 410, the workspace panel 420, and the schema match panel 510. Here, the schema match panel results from dragging and dropping the "Credits" element in the place occupied by the "Score" element in the row including the "XboxCredits" element. Note that placement of the "Credits" element in the spot occupied by the "Score" element results in the "Score" element taking the place of the "XboxCredits" element in the row including "GameScore." The table 520 is now updated to reflect the new mappings resulting in all schema elements matching. Accordingly, with one simple gesture, namely drag and drop, mismatches are resolved. Subsequently, the user can select button 530 to accept the mappings and enable successful processing by the job.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, learning component 330 can employ such mechanisms to determine or infer mismatches or matches based on previous interactions and other context information.

Figure 7:
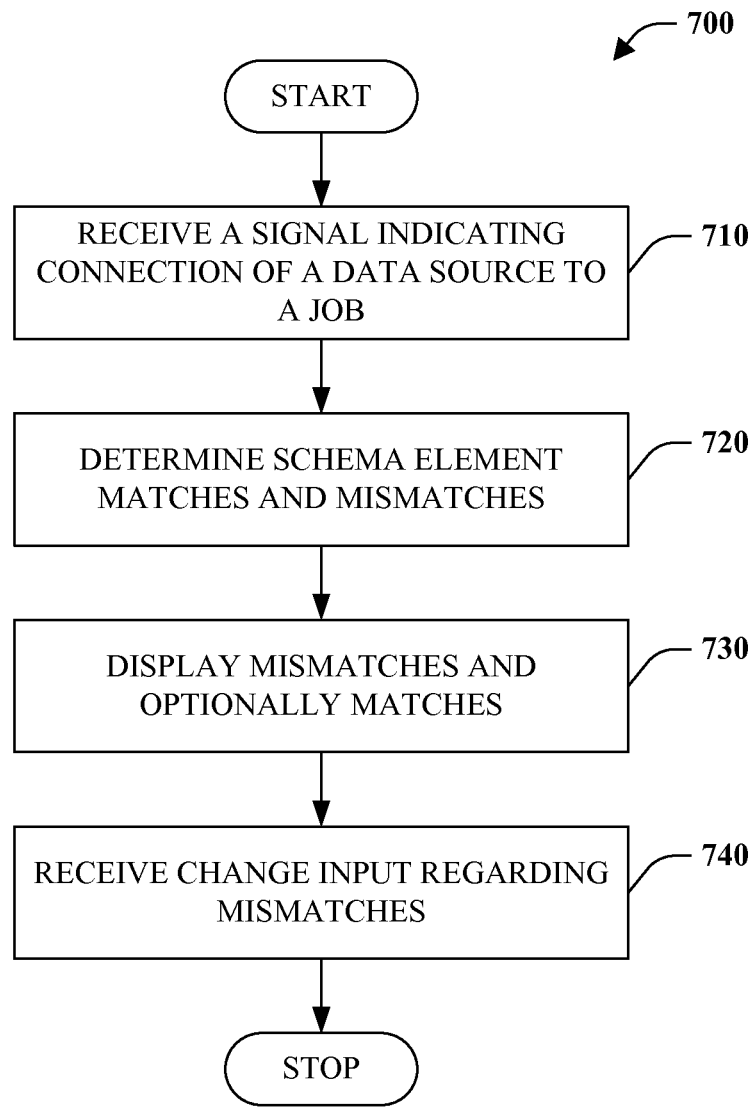
FIG. 7 is a flow chart diagram of a method of detecting and resolving schema mismatch.
Figure 8:
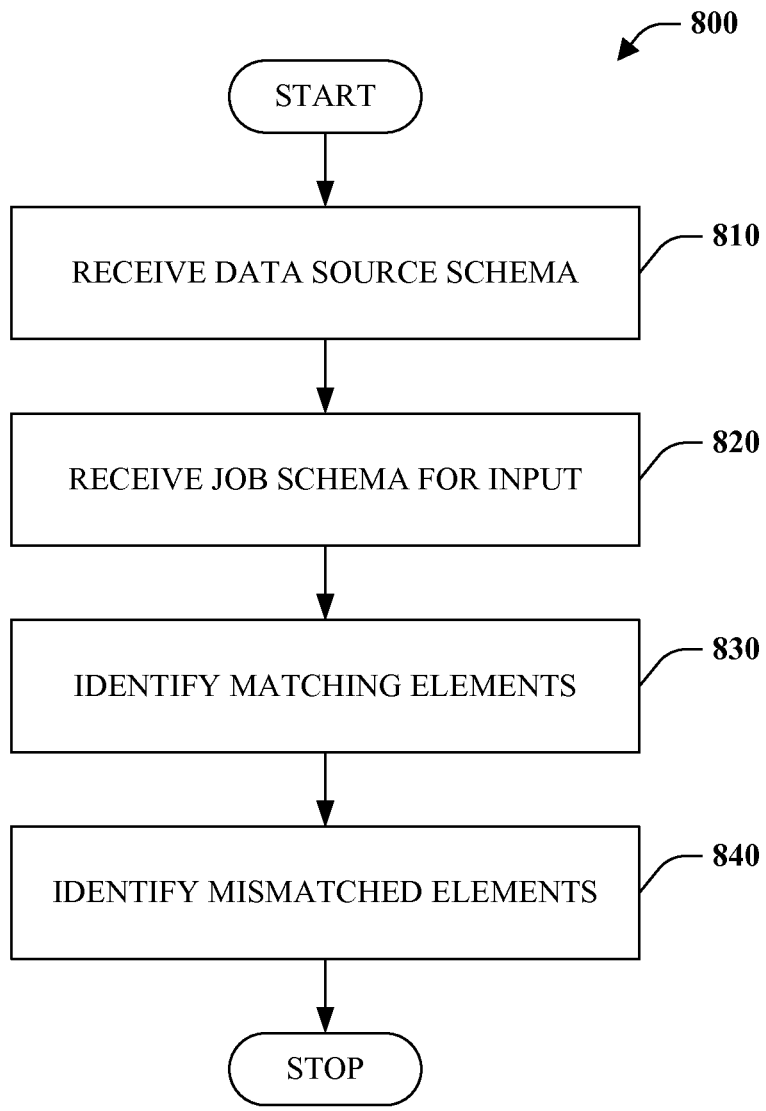
FIG. 8 is a flow chart diagram of a method of schema matching.
Figure 9:
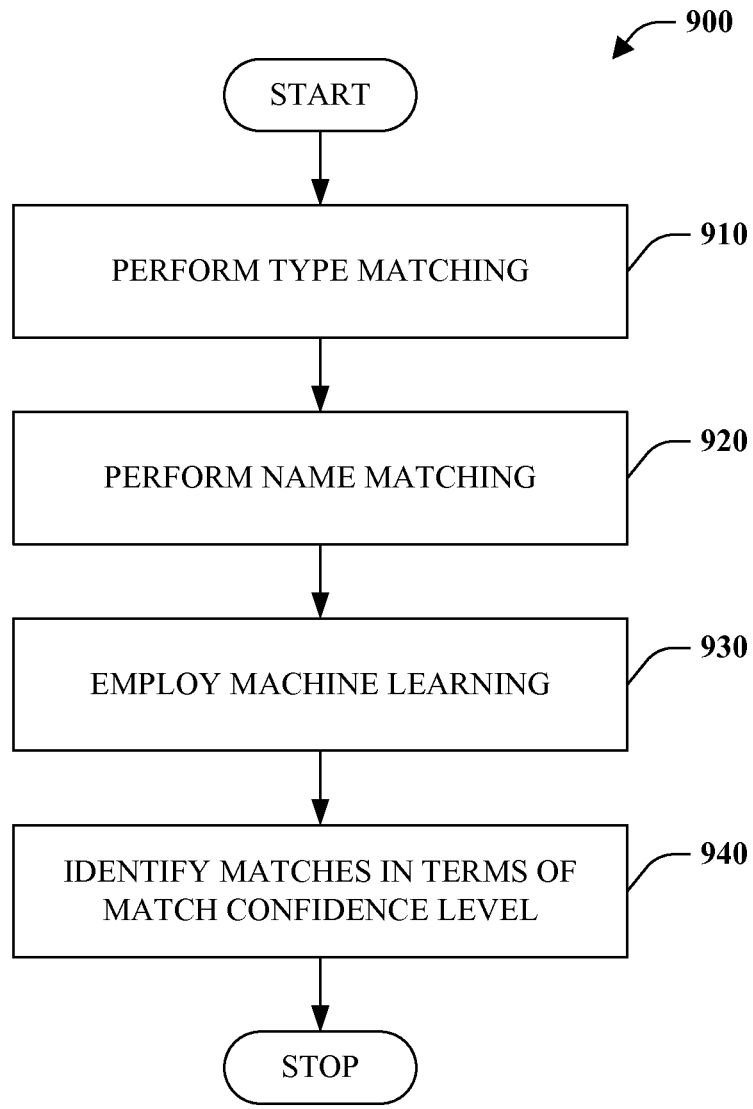
FIG. 9 is a flow chart diagram of a method of classifying schema matches.

In view of the exemplary systems described above, methodologies that may be implemented in accordance with the disclosed subject matter will be better appreciated with reference to the flow charts of FIGS. 7-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 7, a method of detecting and resolving schema mismatches 700 is illustrated. At reference numeral 710, a signal is received indicating connection of a data set (e.g., independent data source, output of a job . . . ), to a job. In an interactive diagrammatic authoring environment, a signal can be generated and subsequently received upon a user connecting a representation of a data set to a representation of job, for instance by drawing a line to connect the two.

After receipt of the signal, schema element matches as well as mismatches can be determined More specifically, the elements of a data set schema are compared with elements of a job schema that describes an expected schema for input data to the job. The comparison can be made between features of the elements (e.g., name, type . . . ) in an attempt to find the best "match" or correspondence between elements. Elements with a confidence measure, expressing strength of correspondence between the elements, above a threshold can be classified as a match. Elements with a confidence measure that falls below the threshold can be classified as a mismatch. In other words, matching between schema elements can be performed to identify the best matches between schema elements based on strength of correspondence, and subsequently matches can be reclassified as mismatches if the strength of correspondence is less than a predetermined threshold for a match.

At numeral 730, mismatches and optionally matches are displayed. In accordance with one embodiment, the mismatches can be displayed in context or in-situ with a workspace so that a user does not have to switch context or focus from one window to another to view both a pipeline diagram and schema mismatches. In accordance with a specific embodiment, schema information can be conveyed in a table form wherein a first column comprises elements of a data set schema, a third column comprises elements of a job schema, and a second column between the first and third columns that indicates whether or not elements match. Further, a confidence measure can be displayed with the indication that indicates the strength of a match based on various factors.

At reference numeral 740, change input is received regarding mismatches. In other words, a signal is received associated with making at least one change to remedy a mismatch. In one embodiment, schema mismatches can be presented in an interactive graphical user interface, such that changes can be made to resolve mismatches. For example, a user can drag and drop a schema element from a first location to a second location that corresponds to a match. Alternatively, lines can be drawn to connect matching schema elements. Regardless of implementation, a user can use simple gestures to perform schema matching, for instance where automatic matching did not. This streamlines the process of schema matching in that much work is eliminated in an automatic way for a user. If problems of mismatch exist, the mismatches can be exposed to a user for resolution.

FIG. 8 depicts a method of schema matching 800. At reference numeral 810, schema associated with a data set is received, retrieved, or otherwise obtained or acquired. If available, the data set schema can be acquired from the source. Alternatively, the schema can be automatically determined or inferred based on analysis of the data set. At numeral 820, a job schema for input is received, retrieved, or otherwise obtained or acquired. The job schema captured expected schema for input data to the job. This schema can be acquired from the job or automatically determined or inferred from the job. Matching elements of the data set scheme and job scheme are identified at 830. Schema defines the shape, or structure of data, and schema elements are portions of a schema that can include a name and type, among other things. Matching elements comprises identifying the same or similar elements between at two schemas based on a variety of schema element features or characteristics such element name. Similarity can be measured in a variety of different ways, and the degree of similarity can vary. Accordingly, a threshold can be established that defines when something is a match such as when the degree of similarity is greater than a predetermined value. At reference 840, mismatch elements are identified. Mismatch elements are elements that do not meet a threshold of similarity or confidence that a match exists. Accordingly, matches that do not meet a predetermined threshold identified as mismatches.

FIG. 9 is a flow chart diagram of a method of classifying schema matches 900. At reference numeral 910, type matching is performed. Here, elements, for example from a data set schema and a job schema, that include the same data type are determined. In this manner, a basic form of matching can be performed based on data types such as string, number, date time, etc. In the example illustrated by the screenshots of FIGS. 4 and 5, "Credits" may be been match with "GameScore" because they are both of type number.

At numeral 920, name matching is performed. In this case, elements from two schemas are analyzed to identify schema elements that have the same or similar name. A dictionary of synonyms can be created and used to understand whether two elements are related in that they have the same name or a name synonym. In the example with respect to the screenshots of FIGS. 4 and 5, "XboxCredits" is a synonym of "Credits" and "GameScore" is a synonym of "Score." Employing name matching in addition to type matching provides more fine grained identification of matches than solely one of type matching or name matching are employed.

At reference 930, machine learning is employed to aid matching. Machine learning can learn relationships between elements based on previous interaction. For example, if a user previously interacted with the system or otherwise indicated that the schema element or field "Score" of a data set maps to the schema element or field "GameScore" of a job, this can be recorded and utilized subsequently when the same user or different user seeks to connect the data source to a job. Furthermore, the learning component can generalize fact such that "Score" and "GameScore" are interpreted as synonyms or even further such that any schema element name that includes "Score" is deemed a synonym.

At reference numeral 940, elements are classified as matches or mismatches based on a predetermined confidence threshold. More specifically, a confidence measure can be assigned to each set of elements as determined based on one or more of type, name, or machine learning. For instance, elements that are of the same type and have the same name will have a higher level of confidence that a match exists than if the elements shared solely one of type or name. Further, elements that share similar, but not identical names, may be assigned a confidence measure less than if the names are the same. Similarly, elements that share related or equivalent data types but not the same data type may be assigned a confidence measure that is less than that which is assigned to identical types. In general, a confidence measure or score can be assigned to each "matching" element set. Subsequently, element sets can be classified as matches or mismatches based on a predetermined confidence threshold. For example, element pairs that have a confidence measure of seventy percent (70%) or greater, meaning the system is seventy percent (70%) or more sure that a match exists, can be classified as matches while pairs that have a confidence measure less than seventy percent will be classified as mismatches. Stated differently, the strength of the match between elements determines whether it is deemed a match or mismatch. Of course, other classifications are possible and thresholds may vary. By way of example, element pairs may be assigned colors indicative of the confidence measure including green where the confidence measure is greater than eighty percent (80%), yellow where the measure is between eighty percent (80%) and fifty percent (50%), and red where the measure is less than fifty percent (50%).

Jobs are connected with data sets to perform a transformation over the data set. However, differences typically exist between the schema of a data set and the schema a job expects. Absent resolution of these differences, the job execution may fail or produce erroneous results. This can be addressed by computing a measure of strength of correspondence between schema elements of a data set and a job. The strength of correspondence can then be compared with one or more predetermined thresholds to identify matches as well as mismatches automatically. A user can be subsequently notified of schema mismatches. Further, a mechanism is provided to enable the user to resolve mismatches between schema elements. For example, a user can correctly map schema elements by interacting with representations of schema elements presented with a graphical user interface. As a result, a state change is effected from mismatching to matching schemas.

The subject disclosure supports various products and processes that perform, or are configured to perform, various actions regarding schema mismatch detection. What follows are one or more exemplary methods and systems.

A method comprises presenting on a display in a first portion of an interface a representation of a data set on a workspace configured to support authoring of a pipeline with a diagram, wherein the pipeline comprises a set of one or more related jobs with output of a first job optionally providing input to a second job; initiating performance of schema mismatch detection in response to connection of a representation of a data set to a representation of a job on the workspace; and presenting on the display in a second portion of the interface a representation of one or more schema mismatches between the data set and the job. The method further comprising performing the schema mismatch detection by comparing a measure of strength of correspondence between a schema element of the data set and a schema element of the job with a predetermined threshold. The method further comprises presenting on the display in a third portion of the interface a representation of one or more elements of a data set schema and one or more elements of a job schema. The method further comprises presenting on the display in the third portion of the interface a visual indication of correspondence strength between a first element of the one or more elements of the data set schema and a second element from the one or more elements of the job schema. The method further comprises presenting a visual indication of mismatch based on comparison of the correspondence strength with the predetermined threshold. The method further comprises presenting a visual indication of a match based on comparison of the correspondence strength with the predetermined threshold or a different predetermined threshold. The method further comprises receiving a signal associated with correcting one of the one or more mismatches with respect to the second portion of the interface. The method further comprises receiving a signal that selects mismatched first schema element, drags the first schema element from its original position, and drops the first schema element in a target position occupied by a second schema element. The method further comprises automatically moving the second schema element to the original position of the first schema element.

A method comprises employing at least one processor configured to execute computer-executable instructions stored in a memory to perform the following acts: detecting connection of an input data set to a job by way of a graphical user interface workspace configured to support diagrammatic authoring of a pipeline comprising a set of one or more related jobs with output of a first job optionally providing input to second job; determining one or more mismatches between schema elements of the data set and the job by comparing a measure of strength of correspondence between schema elements of the data set and the job with a predetermined threshold; and presenting the one or more mismatches within context of the workspace. The method further comprises determining correspondence strength between the schema elements based on at least one of data type or name comparison. The method further comprises identifying one or more matches between schema elements of the input data set and the job based on comparison of the strength of correspondence with the predetermined threshold or a different predetermined threshold. The method further comprises distinguishing a match from the mismatch visually. The method further comprises receiving a signal to assign a schema element of the input data set to a different schema element of the job. The method further comprises receiving selection of the schema element, a drag operation, and a drop operation with respect to a visual representation of one of the one or more mismatches.

A system comprises a processor coupled to a memory, the processor configured to execute the following computer-executable components stored in the memory: a first component configured to present a visual workspace for authoring pipelines, comprising a set of one or more related jobs with output of a first job optionally providing input to second job, diagrammatically; a second component configured to identify one or more schema mismatches between schema elements of a data set and a job, in response to connection of a representation of the data set to a representation of the job on the workspace, based on a comparison of a measure of strength of correspondence between the schema elements of the data set and the job with a predetermined threshold; and a third component configured to present the one or more schema mismatches between the data set and the job. The third component is further configured to present the mismatches in context with the workspace. The second component is further configured to determine strength of correspondence between the schema elements of the data set and the schema elements of the job based on at least data type and name of schema elements. The system further comprises a fourth component configured to enable graphical reassignment of mismatch schema elements. The fourth component is further configured to support drag and drop interaction with visual representations of the mismatch schema elements.

A system comprises a processor coupled to a memory, the processor configured to execute the following computer-executable components stored in the memory: a first component configured to detect connection of an input data set to a job by way of a graphical user interface workspace configured to support diagrammatic authoring of a pipeline comprising a set of one or more related jobs with output of a first job optionally providing input to second job; a second component configured to determine one or more mismatches between schema elements of the data set and the job by comparing a measure of strength of correspondence between schema elements of the data set and the job with a predetermined threshold; and a third component configured to present the one or more mismatches within context of the workspace. The system further comprises a component configured to determine correspondence strength between the schema elements based on at least one of data type or name comparison. The system further comprises a component configured to identify one or more matches between schema elements of the input data set and the job based on comparison of the strength of correspondence with the predetermined threshold or a different predetermined threshold. The system of further comprises a component configured to receive a signal to assign a schema element of the input data set to a different schema element of the job. The system further comprises a component configured to receive selection of the schema element, a drag operation, and a drop operation with respect to a visual representation of one of the one or more mismatches.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
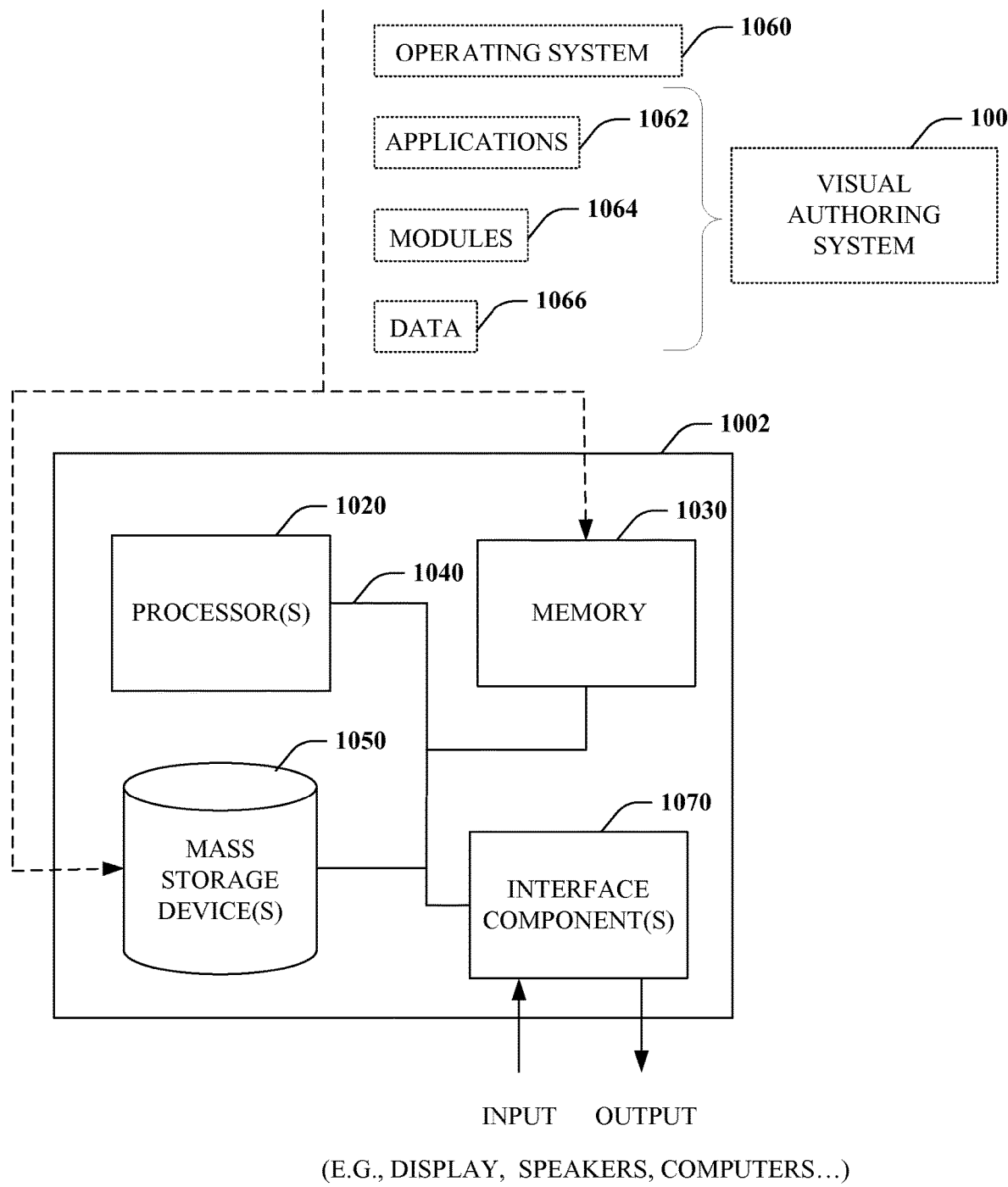
FIG. 10 is a schematic block diagram illustrating a suitable operating environment for aspects of the subject disclosure.

In order to provide a context for the claimed subject matter, FIG. 10 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory devices.

With reference to FIG. 10, illustrated is an example general-purpose computer or computing device 1002 (e.g., desktop, laptop, tablet, watch, server, hand-held, programmable consumer or industrial electronics, set-top box, game system, compute node . . . ). The computer 1002 includes one or more processor(s) 1020, memory 1030, system bus 1040, mass storage device(s) 1050, and one or more interface components 1070. The system bus 1040 communicatively couples at least the above system constituents. However, it is to be appreciated that in its simplest form the computer 1002 can include one or more processors 1020 coupled to memory 1030 that execute various computer executable actions, instructions, and or components stored in memory 1030.

The processor(s) 1020 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1020 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) can be a graphics processor.

The computer 1002 can include or otherwise interact with a variety of computer-readable media to facilitate control of the computer 1002 to implement one or more aspects of the claimed subject matter. The computer-readable media can be any available media that can be accessed by the computer 1002 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 1002. Accordingly, computer storage media excludes modulated data signals.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1030 and mass storage device(s) 1050 are examples of computer-readable storage media. Depending on the exact configuration and type of computing device, memory 1030 may be volatile (e.g., RAM), non-volatile (e.g., ROM, flash memory . . . ) or some combination of the two. By way of example, the basic input/output system (BIOS), including basic routines to transfer information between elements within the computer 1002, such as during start-up, can be stored in nonvolatile memory, while volatile memory can act as external cache memory to facilitate processing by the processor(s) 1020, among other things.

Mass storage device(s) 1050 includes removable/non-removable, volatile/non-volatile computer storage media for storage of large amounts of data relative to the memory 1030. For example, mass storage device(s) 1050 includes, but is not limited to, one or more devices such as a magnetic or optical disk drive, floppy disk drive, flash memory, solid-state drive, or memory stick.

Memory 1030 and mass storage device(s) 1050 can include, or have stored therein, operating system 1060, one or more applications 1062, one or more program modules 1064, and data 1066. The operating system 1060 acts to control and allocate resources of the computer 1002. Applications 1062 include one or both of system and application software and can exploit management of resources by the operating system 1060 through program modules 1064 and data 1066 stored in memory 1030 and/or mass storage device (s) 1050 to perform one or more actions. Accordingly, applications 1062 can turn a general-purpose computer 1002 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, visual authoring system 100 or portions thereof, can be, or form part, of an application 1062, and include one or more modules 1064 and data 1066 stored in memory and/or mass storage device(s) 1050 whose functionality can be realized when executed by one or more processor(s) 1020.

In accordance with one particular embodiment, the processor(s) 1020 can correspond to a system on a chip (SOC) or like architecture including, or in other words integrating, both hardware and software on a single integrated circuit substrate. Here, the processor(s) 1020 can include one or more processors as well as memory at least similar to processor(s) 1020 and memory 1030, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the visual authoring system 100 and/or associated functionality can be embedded within hardware in a SOC architecture.

The computer 1002 also includes one or more interface components 1070 that are communicatively coupled to the system bus 1040 and facilitate interaction with the computer 1002. By way of example, the interface component 1070 can be a port (e.g., serial, parallel, PCMCIA, USB, FireWire . . . ) or an interface card (e.g., sound, video . . . ) or the like. In one example implementation, the interface component 1070 can be embodied as a user input/output interface to enable a user to enter commands and information into the computer 1002, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 1070 can be embodied as an output peripheral interface to supply output to displays (e.g., LCD, LED, plasma . . . ), speakers, printers, and/or other computers, among other things. Still further yet, the interface component 1070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method performed by a system comprising at least one processor coupled to a memory storing machine-executable instructions, which, when executed by the processor, control the system to perform acts comprising:
    conveying, for display on a display device, a representation of a data set on a workspace configured to support diagrammatic authoring, without regard to schema, of a data transformation pipeline comprising a set of one or more jobs, wherein a job receives data from one or more data sources, applies a transformation specified by the job to the data, and outputs transformed data; and
    prior to performing the job:
        receiving an input signal from a user connecting a job of the set of one or more jobs to a data set on the workspace;
        initiating, automatically in response to the input signal from the user, identification of schema elements of the data set and the job and computation of a measure of strength of correspondence between the schema elements of the data set and the job;
        identifying best matches based on the measure of strength of correspondence between schema elements of the data set and the job, wherein a best match corresponds to the greatest measure of strength of correspondence between a schema element of the data set and the job;
        determining one or more schema mismatches by comparing the measure of strength of correspondence between the best matches to a predetermined threshold indicative of mismatch; and
        conveying, for display on the display device, a representation of the one or more schema mismatches between the data set and the job in context with the workspace and an interactive mechanism that enables a user to remedy the schema mismatches graphically.

2. The method of claim 1 further comprises conveying, for display on the display device, one or more elements of a data set schema and one or more elements of a job schema.

3. The method of claim 2 further comprises conveying, for display on the display device, a visual indication of the measure of strength of correspondence between a first element of the one or more elements of the data set schema and a second element from the one or more elements of the job schema.

4. The method of claim 3 further comprises presenting a visual indication of mismatch based on comparison of the measure of strength of correspondence with the predetermined threshold.

5. The method of claim 4 further comprises presenting a visual indication of a match based on comparison of the measure of strength of correspondence with the predetermined threshold or a different predetermined threshold.

6. The method of claim 1 further comprises:
    receiving a signal associated with correcting one of the one or more mismatches; and
    conveying, for display on the display device, an updated representation with changes corresponding to correcting the one or more mismatches.

7. The method of claim 6 further comprises receiving a signal that selects a mismatched first schema element, drags the first schema element from its original position, and drops the first schema element in a target position occupied by a second schema element.

8. A method performed by a system comprising at least one processor coupled to a memory storing machine-executable instructions, which, when executed by the processor, control the system to perform acts comprising:
    detecting connection of an input data set to a job by way of a graphical user interface workspace configured to support diagrammatic authoring, without regard to schema, of a data transformation pipeline comprising a set of one or more jobs, wherein a job receives data from one or more sources, applies a transformation specified by the job to the data, and outputs transformed data; and
    prior to performing the job:
        initiating, automatically in response to detecting the connection, identification of schema elements of the data set and the job and computation of a measure of strength of correspondence between the schema elements of the data set and the job;
        identifying best matches based on the measure of strength of correspondence between schema elements of the data set and the job, wherein a best match corresponds to the greatest measure of strength of correspondence between a schema element of the data set and the job;
        determining one or more mismatches by comparing the measure of strength of correspondence of the best matches with a predetermined threshold; and
        conveying, for display on a display device, the one or more mismatches within context of the workspace.

9. The method of claim 8 further comprises determining the measure of strength of correspondence between the schema elements based on at least one of data type or name comparison.

10. The method of claim 8 further comprises identifying one or more matches between schema elements of the input data set and the job based on comparison of the measure of strength of correspondence with the predetermined threshold or a different predetermined threshold.

11. The method of claim 10 further comprises distinguishing a match from the mismatch visually.

12. The method of claim 8 further comprises:
receiving a signal to reassign a schema element of the input data set to a different schema element of the job; and
conveying, for display on the display device, an updated view reflecting reassignment of the schema element.

13. The method of claim 12 further comprises receiving selection of the schema element, a drag operation, and a drop operation with respect to a visual representation of one of the one or more mismatches.

14. A system comprising:
a processor coupled to a memory, the processor configured to execute machine-executable instructions stored in the memory that, when executed, perform acts comprising:
conveying, for display on a display device, a visual workspace for diagrammatic authoring, without regard to schema, of data transformation pipelines comprising a set of one or more jobs, wherein a job receives data from one or more sources, applies a transformation specified by the job to the data, and outputs transformed data; and
prior to performing the job:
receiving an input signal from a user connecting a job of the set of one or more jobs to a data set on the workspace;
initiating, automatically in response to the input signal from the user, identification of schema elements of the data set and the job and computation of a measure of strength of correspondence between the schema elements of the data set and the job;
identifying best matches based on the measure of strength of correspondence between schema elements of the data set and the job, wherein a best match corresponds to the greatest measure of strength of correspondence between a schema element of the data set and the job;
determining one or more schema mismatches based on a comparison of the measure of strength of correspondence of the best matches with a predetermined threshold; and
conveying, for display on the display device, the one or more schema mismatches between the data set and the job.

15. The system of claim 14, the acts further comprise conveying, for display on the display device, the mismatches in context with the workspace.

16. The system of claim 14, the acts further comprise determining the measure of strength of correspondence between the schema elements of the data set and the schema elements of the job based on at least data type and name of schema elements.

17. The system of claim 14, the acts further comprise:
receiving graphical reassignment of mismatch schema elements; and
conveying, for display on the display device, and updated view reflecting the graphical reassignment.

18. The system of claim 17, the acts further comprise receiving graphical reassignment in form of drag and drop interaction with visual representations of the mismatch schema elements.

19. A system comprising:
a processor coupled to a memory, the processor configured to execute machine-executable instructions stored in the memory that when executed perform acts comprising:
detecting connection of an input data set to a job by way of a graphical user interface workspace configured to support diagrammatic authoring, without regard to schema, of a data transformation pipeline comprising a set of one or more jobs, wherein a job receives data from one or more sources, applies a transformation specified by the job to the data, and outputs transformed data; and
prior to performing the job:
initiating, in response to detecting the connection, identification of schema elements of the data set and the job and computation of a measure of strength of correspondence between the schema elements of the data set and the job;
identifying best matches based on the measure of strength of correspondence between schema elements of the data set and the job, wherein a best match corresponds to the greatest measure of strength of correspondence between a schema element of the data set and the job;
determining one or more mismatches between schema elements of the data set and the job by comparing the measure of strength of correspondence between the best matches with a predetermined threshold; and
presenting the one or more mismatches within context of the workspace.

20. The system of claim 19, the acts further comprise computing the measure of strength of correspondence between the schema elements based on at least one of data type or name comparison.

21. The system of claim 19, the acts further comprise identifying one or more matches between schema elements of the input data set and the job based on comparison of the measure of strength of correspondence with the predetermined threshold or a different predetermined threshold.

22. The system of claim 19, the acts further comprise:
receiving a signal to reassign a schema element of the input data set to a different schema element of the job; and
presenting an updated view reflecting reassignment of the schema element.

23. The system of claim 22, the acts further comprise receiving selection of the schema element, a drag operation, and a drop operation with respect to a visual representation of one of the one or more mismatches.

24. The system of claim 14, the job receives data from two or more data sources and applies a transformation specified by the job on the data from the two or more data sources.

25. The system of claim 14, the transformation specified by the job is one of a sort or pivot.

* * * * *